United States Patent [19]

DeVilbiss

[11] Patent Number: 4,763,193

[45] Date of Patent: Aug. 9, 1988

[54] AUTOMATIC DETERMINATION OF TIME BASE IN ELECTRONIC TIME-KEEPING APPARATUS

[75] Inventor: Warren C. DeVilbiss, Noblesville, Ind.

[73] Assignee: RCA Licensing Corporation, Princeton, N.J.

[21] Appl. No.: 1,361

[22] Filed: Jan. 8, 1987

[51] Int. Cl.[4] .......................... G04F 5/00; H04N 5/262

[52] U.S. Cl. ...................................... 358/149; 368/156

[58] Field of Search ...................... 358/140, 191.1, 149, 358/139, 181, 188; 368/47, 56, 115, 156, 200

[56] References Cited

U.S. PATENT DOCUMENTS

| | | | |
|---|---|---|---|
| 4,264,967 | 4/1981 | Fujita | 368/156 |
| 4,464,679 | 8/1984 | Wargo | 358/149 X |
| 4,605,967 | 8/1986 | Pires | 358/181 X |

FOREIGN PATENT DOCUMENTS 61-95682 5/1986 Japan .

OTHER PUBLICATIONS

Sharp Service Manual DV-1620S, p. 15.

The National Semiconductor MOS Databook, 1980, pp. 6-43 to 6-52, AN-196, "Programmable TV Timer/-Time-Channel Display".

*Primary Examiner*—Howard W. Britton

*Assistant Examiner*—Victor R. Kostak

*Attorney, Agent, or Firm*—Paul J. Rasmussen; P. M. Emanuel; T. F. Lenihan

[57] ABSTRACT

An AC line signal of unknown frequency is compared to a signal of known reference to determine the frequency of the AC line signal. Thereafter, the AC line frequency signal is used as a time-base for keeping real time.

10 Claims, 2 Drawing Sheets

AUTOMATIC DETERMINATION OF TIME BASE IN ELECTRONIC TIME-KEEPING APPARATUS

FIELD OF THE INVENTION

This invention relates to electronic time-keeping apparatus using an external periodic signal, such as an AC power line signal, for a time base.

BACKGROUND OF THE INVENTION

In electronic time-keeping apparatus, the use of the frequency regulated AC power line signal as a time-base is preferred over the use of a crystal oscillator signal when the former choice is practical, as in nonmobile applications, because crystal controlled oscillators or the like can drift over a period of time thereby introducing time-keeping errors. Likewise, in a television receiver the vertical sync signal previously has been used as a time-base signal for time-keeping apparatus. However, such use of the vertical sync signal also introduces time-keeping errors. These errors result because the time base is lost when the television receiver is turned off, and because the time base is interrupted whenever channels are changed or when an alternate source of video signals, such as a VCR, videodisc player, or a video game is selected. Long term stability is clearly desirable for time-keeping purposes, and the AC power line signal is a convenient source of a stable time-base reference signal.

Although North America has chosen 60 Hz for its power line frequency, a large portion of the world has chosen 50 Hz as a power line frequency. An electronic clock designed to use 60 Hz signals as a time-base will count at 83.33% of its normal rate if provided with 50 Hz signals, resulting in a loss of 10 minutes per hour. On the other hand, an electronic clock designed to use 50 Hz signals as a time-base will count at 120% of its normal rate if provided with 60 Hz signals, resulting in a gain of 12 minutes per hour. In both cases, the clocks are essentially inoperative.

It would be economically undesirable to design an electronic time-keeping apparatus which is unable to use either 50 Hz or 60 Hz signals as a time-base, since to do so would severely limit the marketability of the apparatus. However, if the apparatus is to operate correctly at either 50 Hz or 60 Hz some means must be provided to indicate to its counting circuitry which frequency will be used as the time base. Prior art systems have addressed this problem by providing an extra input terminal which is jumpered or hardwired to a logic reference voltage to act as a "flag" signal. The logic state of this flag signal indicates which of the two frequencies is to be used as the time base. A system of this type is known, for example, from the National Semiconductor MOS Databook, 1980, pages 6-43 to 6-52, AN-196.

As real time clock applications become more complex, the number of available external connection terminals becomes critical, making it undesirable to dedicate a terminal to such a time base "flag" function. The installation of jumper wires during manufacturing is a costly and time-consuming procedure which requires knowledge of the geographic area in which the particular unit being assembled will be sold. The state of the jumper wire flag must be reversed if, for example, a particular unit originally intended for sale in North America is to be shipped instead to a 50 Hz market. An error in the placement of the jumper wire flags at the factory will result in the shipment of essentially inoperative units to the buyer. Likewise, a unit purchased in a 50 Hz market cannot operate without modification when transported to an area using 60 Hz as the power line frequency.

SUMMARY OF THE INVENTION

An electronic time-keeping apparatus is automatically adapted to operate with any one of a plurality of external time-base signals of different frequencies by using a local oscillator signal to determine the frequency of the time-base signal. In a disclosed embodiment of the invention, a reference value, used by a counter, is changed in response to the determination of the time-base frequency. The counter counts transitions of the time-base signal and generates time-indicative signals when accumulated count of the counter attains the reference value.

Apparatus in accordance with the principles of the present invention advantageously eliminates the need for a jumper wire operating as a frequency flag, but maintains the capability of operating with either 50 Hz or 60 Hz as a time base, and is fully operable if transported between areas using different power line frequencies.

DETAILED DESCRIPTION OF THE INVENTION

Apparatus according to one embodiment of the invention, when first plugged into an AC power source, performs a measurement of the AC signal frequency and thereafter uses the AC signal as a time-keeping time-base signal.

Figure 1:
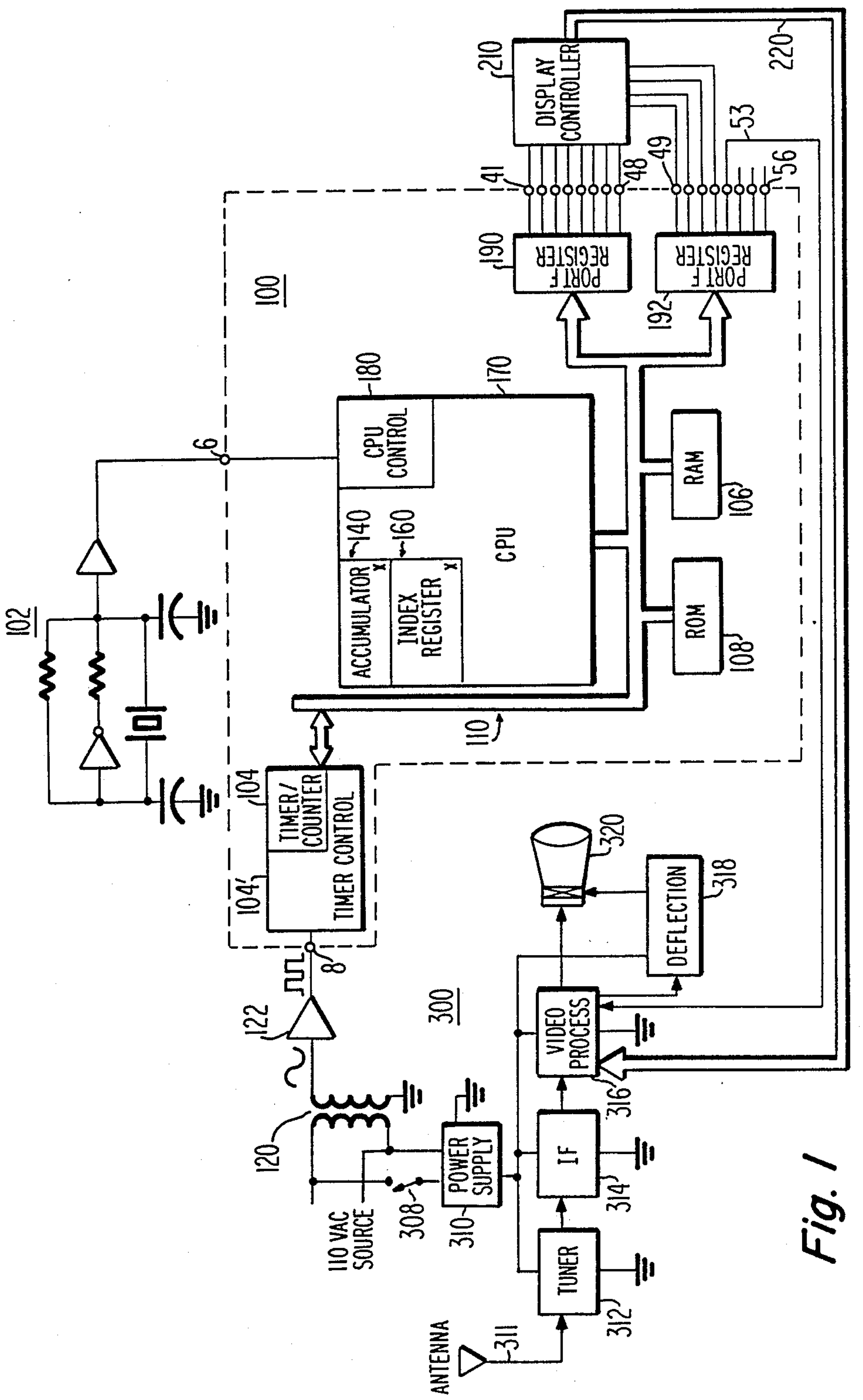
FIG. 1 shows an embodiment of the invention using a microprocessor.

Referring to FIG. 1, a microprocessor 100 receives clock signals from an oscillator 102 which may be crystal controlled, via a terminal 6. Microprocessor 100 uses these clock signals to regulate its internal functions such as memory addressing and sequential execution of program steps.

Microprocessor 100 includes a built-in timer 104 (sometimes referred to as a hardware timer), a random access memory (RAM) 106 and a program storage read only memory (ROM) 108. Binary signals indicative of time are provided at output terminals 41–48 for coupling to a display controller 210. Some of output terminals 49–56 may be coupled to control other circuitry such as an alarm, or recording circuitry in a VCR or may provide an indication of whether 50 Hz or 60 Hz time-base signals have been detected. Other terminals of terminals 49–56 may be coupled to display controller 210 to indicate, for example, AM/PM, hours, minutes, seconds, day, and date. Microprocessor 100 also includes an accumulator 140 and an index register 160 used with the program of TABLE 1 below. The microprocessor includes a CPU 170, under control of a CPU control unit 180. A microprocessor having such an arrangement of elements is the type HD6305Y0 commercially available from Hitachi Corporation. The terminal designations of element 100 of FIG. 1 are those corresponding to the Hitachi HD6305Y0.

In a television receiver having television signal processing circuitry 300, an AC switch 308 couples AC power to a power supply 310. Power supply 310 supplies voltages of the proper polarity and magnitude to television signal processing units 312–318 of conventional design. Television signals are received by an antenna 311 and coupled to tuner 312 for selection and translation to an intermediate frequency (IF) signal. IF unit 314 amplifies the IF signal and couples it to video processing unit 316 for detection and further amplification. Video processing unit 316 provides synchronizing signals to deflection unit 318 and video signals to kinescope 320 for display. Display controller 210 provides signals via bus 220 to video processing unit 316 in order that time-indicative signals may be displayed on a predetermined portion of the screen of kinescope 320.

Alternately, display controller 210 may provide time-indicative signals to an LED or LCD display (not shown).

An AC signal is derived from the AC power line by a transformer 120 or other suitable signal amplitude conditioning circuitry, and is coupled to a sine-to-square wave converter 122 which transforms the AC time-base signal into a pulse signal with an amplitude which is acceptable to microprocessor 100, at an input terminal 8. When the present invention is incorporated into a device such as a television receiver, which has an AC power on-off switch, for example 308, the AC time-base signal is coupled to the signal amplitude conditioning circuitry independent of the switch so that the time-keeping function is uninterrupted when the power is turned off to the remainder of the receiver.

Timer 104, when loaded with a prescribed initial binary count, will automatically decrement by one count each time a line frequency pulse is detected. In this embodiment of the invention, microprocessor 100 enters a 500 millisecond delay interval after an initial count of 28 is loaded into timer 104. An incoming line frequency signal of 50 Hz should cause timer control unit 104' to produce 25 decrements of the value in timer 104 in 500 milliseconds, but an incoming line frequency signal of 60 Hz should cause 30 decrements in 500 milliseconds. Therefore, for an AC line frequency choice limited to 50 Hz and 60 Hz, if the timer contains a positive value at the end of the 500 millisecond time delay, then the line frequency is known to be 50 Hz. If, however, the timer contains a negative value, then the line frequency is known to be 60 Hz. Microprocessor 100 causes a stored reference value to be set in RAM 106 based on a determination of whether the incoming AC line frequency is 50 Hz or 60 Hz. The initial count value of 28 is chosen to allow for the possibility of missed pulses at the beginning or the end of the 500 millisecond delay interval. It is particularly advantageous that for measurement of an unknown external time-base signal, the present invention requires no additional circuitry for generating a reference signal, but rather uses the microprocessor clock signal already provided by oscillator 102.

Figure 2:
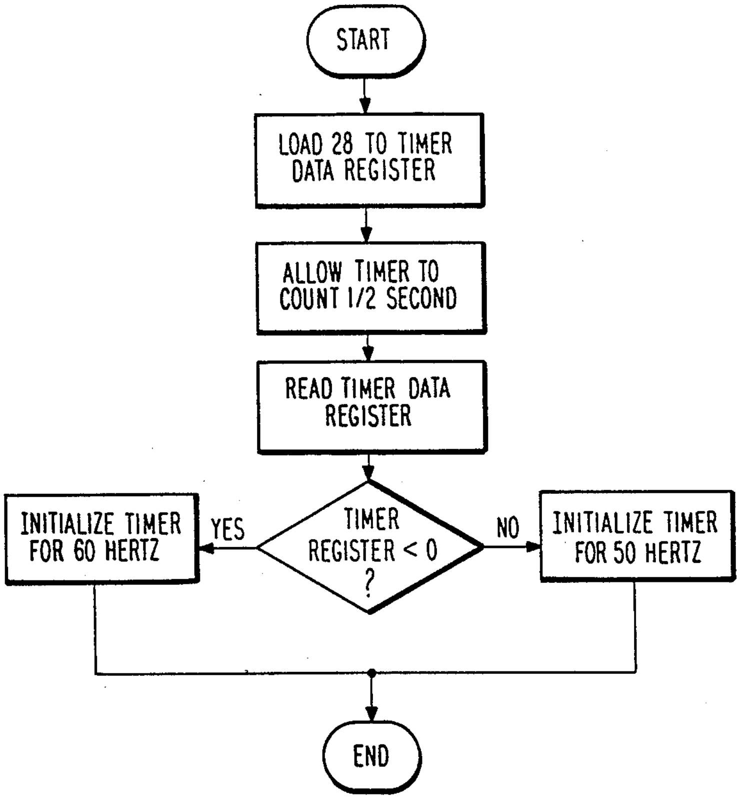
FIG. 2 shows a flow chart of a program used by the microprocessor of FIG. 1.

Table 1, listed below, illustrates an assembly language software program for a Hitachi HD6305Y0 microprocessor for automatic determination of whether the AC line frequency is 50 Hz or 60 Hz. The program steps of Table 1 implement the algorithm of the flowchart illustrated in FIG. 2. Timer 104, automatically decremented by the AC line frequency signals, has an input/output (I/O) port which is addressed as if it were a RAM location via bus 110. TMRDATA is a label which corresponds to the address of the I/O port of Timer 104. The variable TIMEDLY and the subroutine WAIT18 are used in a one-half second time delay loop designated TLOOP. The assembly language routine of TABLE 1 is entered at SETCLK, which loads the count value 28 into TIMEDLY and into the hardware timer TMRDATA, then advances to TLOOP. In TLOOP a branch to an 18 millisecond time delay subroutine is executed and upon return TIMEDLY is decremented. So long as TIMEDLY contains a positive value, the program will repeatedly branch to TLOOP. When TIMEDLY contains a zero value, the hardware timer register TMRDATA is read. If TMRDATA contains a negative number than the 50/60 Hz variable TIMECNT is loaded with the value 60. If, however, TMRDATA contains a positive number then TIMECNT is loaded with the value 50. From this point, the microprocessor can keep time by counting AC line frequency signal transitions since the AC line frequency has been determined.

TABLE 1

SOFTWARE FOR HITACHI HD6305Y0 FOR AUTOMATIC DETERMINATION OF 50/60 Hz LINE FREQUENCY

| Label | MNEMONIC | OPERAND | COMMENTS |
|---|---|---|---|
| SETCLK: | LDA | #28 | ; |
| | STA | TIMEDLY | ; Initialize count register |
| | STA | TMRDATA | ; For 28 counts |
| TLOOP: | BSR | WAIT18 | ; 18 msec delay |
| | DEC | TIMEDLY | ; |
| | BPL | TLOOP | ; Check if approximately ½ second has passed |
| | LDX | #60 | ; |
| | LDA | TMRDATA | ; Check if 60 or 50 Hz |
| | BMI | HZ60 | ; If under flow, then > 28 ticks |
| HZ50: | LDX | #50 | ; else, set to 50 Hz |
| HZ60: | STX | TIMECNT | ; Store count reset value |
| 18 MILLISECOND TIME DELAY SUBROUTINE | | | |
| WAIT18: | LDA | #18 | ; Load Accumulator with 18 |
| TALOOP: | LDX | #200 | ; Load X register with 200 |
| TXLOOP: | DEC | X | ; Decrement X register |
| | BNE | TXLOOP | ; Check if approximately 1 ms has passed |
| | DEC | A | ; Decrement Accumulator |
| | BNE | TALOOP | ; Check if 18 ms have passed |
| | RTS | | |

As can be seen from the above listing, the portion of available program space within microprocessor 100 which is devoted to time-keeping is quite small (typically less than ½ percent of the total program storage area). Thus, the time-keeping feature can readily be incorporated into a microprocessor which has been included in a television receiver for other purposes, such as tuner control, thus effecting a cost saving over a discrete circuit timer to provide a similar function.

Although the above-described algorithm uses an integral timer-register accessible via program control, external time-base measurement is also possible by counting a number of transitions of a program loop and decrementing a register between successive time-base signal input pulses. The stepping-rate through the program loop is directly related to the frequency of the microprocessor clock oscillator. Therefore, the number of successive steps through the program loop, multiplied by the number of steps in the loop, and multiplied by the number of clock cycles per instruction yields a number which is the reciprocal of the time between the AC line frequency pulses. This alternate algorithm is not limited to determining the frequency between just two input frequencies, but rather can be used to actually measure an unknown input line frequency. The accuracy of the measurement is dependent upon the resolution of the timing loop, which is affected by the microprocessor clock signal frequency, the number of steps in the loop and the number of clock cycles per instruction.

Another aspect of the invention concerns the fact that North America uses a 60 Hz power line frequency and broadcasts television signals using the NTSC system, while European countries, in contrast, use a 50 Hz power line frequency and broadcast television signals using one of the PAL or SECAM systems. The use of the AC power line signal as a time base in a television receiver is particularly advantageous due to its stability and accessibility. Other time-base signals such as television vertical sync suffer from lack of stability during channel changes, or lack of accessibility such as when the television receiver is turned off. Therefore, it is herein recognized that an advantage is realized when the subject invention is incorporated within a television receiver which is capable of automatically modifying its receiver circuitry to receive and process NTSC, PAL or SECAM signals. Specifically, the determination of the AC power line frequency may also serve to prompt the television receiver circuitry via one of output lines 49–56 of unit 192, for example 53, to examine the incoming television signals in order to determine which broadcast system signal is being received, so that the receiver circuitry can be automatically modified to properly process the received signal. Such a television receiver would operate properly when transported between countries utilizing any of the above-listed standard television systems.

While the invention has been described with reference to a microprocessor having circuitry enabling it to be used as a real-time clock, the principles of the invention can be applied to a system using discrete counters, and can be designed into an integrated circuit designed only for use as a real time clock.

What is claimed is:

1. Apparatus for use in a television receiver capable of tuning television signals broadcast in accordance with one of plural different broadcast standards, comprising:

counting means for counting transitions of one of plural external time-base signals said counting means generating signals indicative of time when counts of said counting means attain a reference value;

oscillator means for producing an oscillator signal at a predetermined frequency greater than the highest frequency of said plural external signals;

frequency determining means responsive to said time-base signal and said oscillator signal for determining the frequency of said time-base signal;

control means responsive to said frequency determining means for changing said reference value in response to said frequency determination; and means for responsive to said control signal for causing said receiver to properly process a television signal broadcast with one of said broadcast standards in accordance with the condition of said control signal.

2. The apparatus of claim 1 wherein:

the AC power line frequency is one of said plurality of said time base-signals.

3. The apparatus of claim 9 wherein:

said means responsive to said control signal controls said receiver to process NTSC signals when said external time-base signal exhibits a frequency of 60 Hz.

4. The apparatus of claim 3 wherein:

said television receiver control means examines said television signals to determine if the broadcast standard thereof conforms to one of NTSC, PAL and SECAM, said receiver being controlled to process said television signals accordingly.

5. Electronic time-keeping apparatus capable of automatically operating with one of plural external time-base signals having different frequencies, comprising:

counting means for counting transit ions of said time-base signals, said counting means generating time-indicative signals when counts of said counting means attain a reference value;

means for producing a periodic signal at a predetermined frequency greater than the highest frequency of said plural external signals;

frequency determining means responsive to said time-base signal and said periodic signal for providing a control signal representative of the frequency of said time-base signal; and control means for changing said reference value in response to said control signal; wherein, said frequency determining means measures the period of said time-base signal by counting transitions of said periodic signal;

one of said plural external time-base signals has a frequency of 50 Hz; and another of said plural external time-base signals has a frequency of 60 Hz; and one of said plural time-base signals is an AC power line signal.

6. The apparatus of claim 5 further including:

means coupled to said counting means for displaying a representation of said time-indicative signals.

7. The apparatus of claim 5 wherein:

said counting means, said control means and said frequency determining means are embodied in a microprocessor.

8. The apparatus of claim 7 wherein:

said providing means is an oscillator supplying a clock signal to said microprocessor.

9. The apparatus of claim 8 further including:

means coupled to outputs of said microprocessor for displaying a representation of said time-indicative signals.

10. Electronic time-keeping apparatus capable of automatically operating with one of plural external time-base signals having different frequencies, comprising:

counting means for counting transitions of said time-base signals, said counting means generating time-indicative signals when counts of said counting means attain a reference value;

means for producing a periodic signal at a predetermined frequency greater than the highest frequency of said plural external signals;

frequency determining means responsive to said time-base signal and said periodic signal for providing a control signal representative of the frequency of said time-base signals; and control means for changing said reference value in response to said control signal; wherein, said frequency determining means measures the period of time-base signals by counting transitions of said periodic signal;

one of said plural time-base signals in an AC power line signal; wherein, said counting means, said control means and said frequency determining means are embodied in a microprocessor.

* * * * *